US010019099B2

(12) United States Patent
Harmon et al.

(10) Patent No.: US 10,019,099 B2
(45) Date of Patent: Jul. 10, 2018

(54) SYSTEM FOR EXTENDING THE LIFESPAN OF A TOUCH SCREEN ASSEMBLY

(71) Applicant: Trimble Inc., Sunnyvale, CA (US)

(72) Inventors: John Paul Harmon, Corvallis, OR (US); Christopher Alexander Peskin, Corvallis, OR (US); James Walter Pearson, Corvallis, OR (US); Robert Barnwell Eliott Puckette, Corvallis, OR (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 13/796,112

(22) Filed: Mar. 12, 2013

(65) Prior Publication Data

US 2013/0187885 A1  Jul. 25, 2013

Related U.S. Application Data

(62) Division of application No. 11/491,385, filed on Jul. 20, 2006.

(60) Provisional application No. 60/796,326, filed on Apr. 28, 2006.

(51) Int. Cl.
G06F 3/041 (2006.01)

(52) U.S. Cl.
CPC .................. *G06F 3/0416* (2013.01)

(58) Field of Classification Search
CPC ..... G06F 3/0416; G06F 3/0414; G06F 3/0488
USPC ........................................ 345/173, 156, 178
See application file for complete search history.

(56) References Cited

U.S. PATENT DOCUMENTS

| 5,345,807 | A | * | 9/1994 | Butts et al. ..................... 73/1.15 |
| 5,659,154 | A | * | 8/1997 | Yoshikawa ............. G06F 3/045 178/18.05 |
| 5,844,506 | A | | 12/1998 | Binstead |
| 5,856,822 | A | | 1/1999 | Du et al. |
| 6,861,961 | B2 | | 3/2005 | Sandbach et al. |
| 7,688,315 | B1 | * | 3/2010 | Gettemy ............... G06F 1/1643 178/18.06 |
| 2002/0110237 | A1 | | 8/2002 | Krishnan |
| 2002/0135457 | A1 | * | 9/2002 | Sandbach et al. ............. 338/47 |
| 2002/0140680 | A1 | | 10/2002 | Lu |
| 2005/0076824 | A1 | * | 4/2005 | Cross ..................... G06F 3/045 116/205 |
| 2005/0088416 | A1 | * | 4/2005 | Hollingsworth .......... G06F 3/02 345/173 |
| 2007/0248799 | A1 | | 10/2007 | Deangelis et al. |
| 2007/0261895 | A1 | | 11/2007 | Knowles et al. |
| 2008/0018610 | A1 | | 1/2008 | Harmon et al. |

(Continued)

OTHER PUBLICATIONS

U.S. Appl. No. 11/491,385, Restriction Requirement dated Apr. 8, 2009, 5 pages.

(Continued)

*Primary Examiner* — Bryan Earles
(74) *Attorney, Agent, or Firm* — Kilpatrick Townsend & Stockton (57) ABSTRACT

Embodiments of the present invention recite a system for extending the lifespan of a touch screen assembly. In one embodiment, a signal is received indicating an input pressure is being applied to a touch screen assembly. It is then determined that the input pressure comprises a valid input event and the coordinates of the valid input event are received from the touch screen assembly.

10 Claims, 5 Drawing Sheets

(56) References Cited

U.S. PATENT DOCUMENTS

2013/0187885 A1    7/2013  Harmon et al.

OTHER PUBLICATIONS

U.S. Appl. No. 11/491,385, Non-Final Office Action dated Jul. 14, 2009, 7 pages.
U.S. Appl. No. 11/491,385, Final Office Action dated Dec. 17, 2009, 7 pages.
U.S. Appl. No. 11/491,385, Non-Final Office Action dated Jan. 27, 2012, 7 pages.
U.S. Appl. No. 11/491,385, Final Office Action dated Jun. 13, 2012, 7 pages.
U.S. Appl. No. 11/491,385, Non-Final Office Action dated May 1, 2014, 7 pages.
U.S. Appl. No. 11/491,385, Final Office Action dated Aug. 25, 2014, 8 pages.
U.S. Appl. No. 11/491,385, Non-Final Office Action dated Jul. 17, 2015, 11 pages.
U.S. Appl. No. 11/491,385, Final Office Action dated Dec. 16, 2015, 16 pages.

\* cited by examiner

FIGURE 3

SYSTEM FOR EXTENDING THE LIFESPAN OF A TOUCH SCREEN ASSEMBLY

CROSS-REFERENCE TO RELATED U.S. APPLICATION

This application is a divisional application of and claims the benefit of co-pending U.S. patent application Ser. No. 11/491,385 filed on Jul. 20, 2006 entitled "METHOD AND SYSTEM FOR EXTENDING THE LIFESPAN OF A TOUCH SCREEN ASSEMBLY" by John Paul Harmon, and assigned to the assignee of the present application; the disclosure of which is hereby incorporated herein by reference in its entirety.

The present application also benefits from provisional U.S. application Ser. No. 60/796,326, filed Apr. 28, 2006, titled "Method and System for Extending the Lifespan of a Touch Screen Assembly", by John Paul Hannon, Chris Peskin, James W. Pearson, and Robert Puckette, assigned to the assignee of the present application, and incorporated by reference in its entirety herein.

FIELD OF THE INVENTION

Embodiments in accordance with the present invention generally pertain to devices which utilize a touch screen assembly that may be activated by finger touch or by stylus pressure. More particularly, embodiments of the present invention are related to extending the lifespan of touch screen assembly that may be activated by pressure.

RELATED ART

Flat panel resistive touch screen displays are used in numerous electronic products such as wrist watches, hand calculators, cell phones, and PDA's both to present information to the user as well as to facilitate input of data such as user touch screen commands. Such displays include a resistive digitizer mechanism and a display mechanism. A typical resistive digitizer mechanism consists of a digitizing element having a flexible thin film supported slightly above the surface of another thin layer digitizing element. A pressure applied to the outer surface of the flexible film causes the film to deflect and contact the bottom digitizing element at a point which can be measured and thereby used as an input signal to activate the digitizer mechanism. The flexible film and the digitizing element are typically mounted in a support housing to provide and maintain protection against moisture, dust, and mechanical damage.

Figure 1:
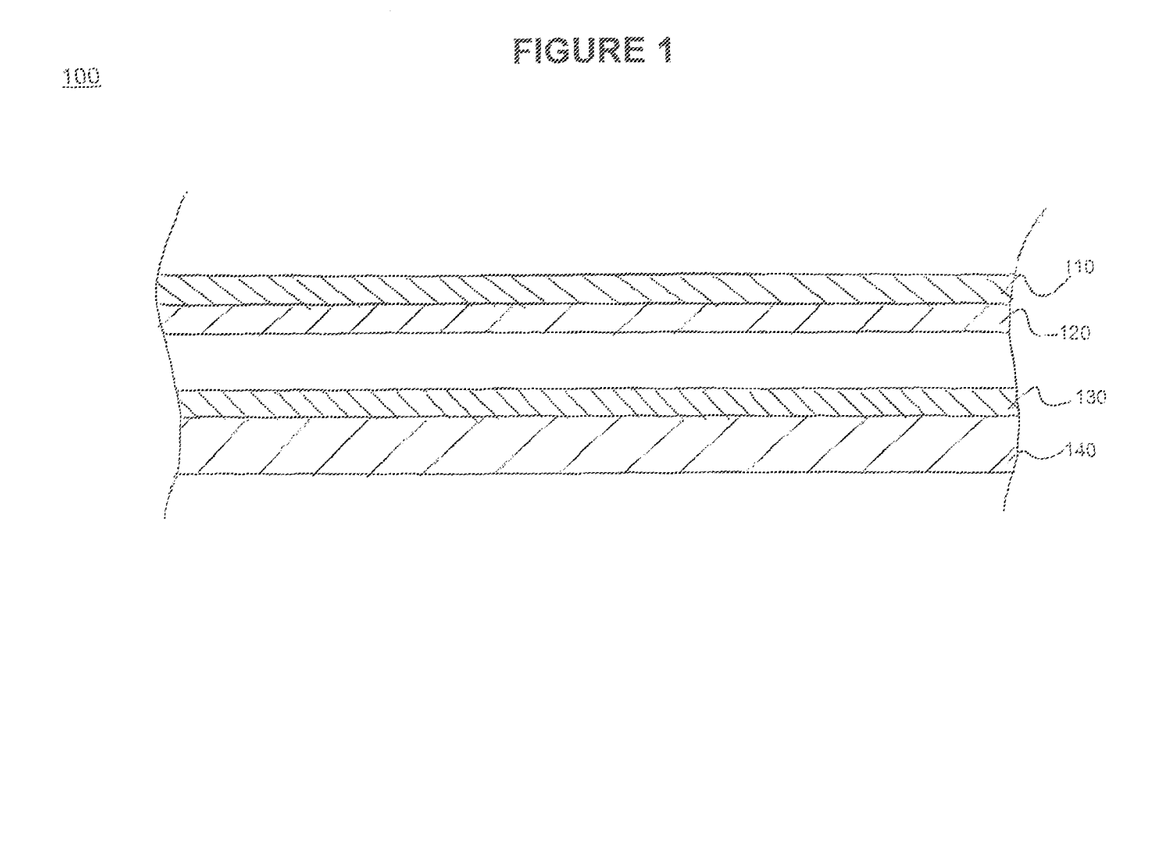
FIG. 1 is a cross section of an exemplary convention touch screen assembly.

FIG. 1 is a cross-section view of an exemplary touch screen assembly 100 utilized in an electronic device. The entire assembly is held in place by the supporting structure 105. The outer protective film 110 (e.g., a layer of Mylar®) provides mechanical and weather protection for the resistive digitizer film 120 (e.g., a layer of Indium Tin Oxide ITO). In addition, outer protective film 110 is coupled to support mechanism 105 in order to provide a moisture and dust seal. The digitizing element 130, typically another layer of ITO, is located below and close to the digitizer film 120. Often, spacers (not shown) are used to separate resistive digitizer film 120 from digitizing element 130 when pressure is not applied to outer protective film 110. An externally applied pressure that deflects the protective film 110 will also deflect the digitizer film 120 so that it contacts digitizing element 130, thus activating the resistive digitizer mechanism. As shown in FIG. 1, digitizing element 130 is disposed on top of a substrate layer 140. Typically, substrate layer 140 is a layer of glass and prevents deflecting or deformation of digitizing element 130 When contacted by digitizer film 120.

One problem associated with touch screen assemblies occurs when they are subject to temperature fluctuations. For example, when moved from a cold environment (e.g., outdoors in winter) to a warmer environment (e.g., indoors) expansion of the size of touch screen assembly 100 may result in inadvertent activating of the resistive digitizer mechanism. More particularly, the expansion of protective film 110 may occur more rapidly, and to a greater extent, than a contraction of substrate layer 140. This may lead to a sagging of protective layer which in turn causes resistive digitizer film 120 to contact digitizing element 130. As a result, this may be interpreted by the electronic device as a user input when in fact no such input was intended. This phenomenon is also exhibited when the touch screen assembly is subject to repeated use. Over time the protective layer 110 can become stretched by mechanical fatigue, and spacer dots (not shown) that keep the digitizing layers 120 and 130 from inadvertently touching mechanically are beat down and become non-functional.

SUMMARY OF THE INVENTION

Accordingly, it would be advantageous to extend the usable lifespan of a touch screen assembly without necessitating replacement of the touch screen assembly itself, or of the device using the touch screen assembly. Additionally, while meeting the above stated need, it would also be minimize the cost associated with extending the usable lifespan of a touch screen assembly.

Embodiments of the present invention recite a method and system for extending the lifespan of a touch screen assembly. In one embodiment, a signal is received indicating an input pressure is being applied to a touch screen assembly. It is then determined that the input pressure comprises a valid input event and the coordinates of the valid input event are received from the touch screen assembly.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "comparing," "determining," "receiving," or "generating" or the like, refer to the actions and processes of a computer system, or a similar electronic computing device, that manipulates and transforms data represented as physical (electronic) quantities within the computer systems registers and memories into other data similarly represented as physical quantities within the computer system memories or registers or other such information storage, transmission or display devices.

Figure 2:
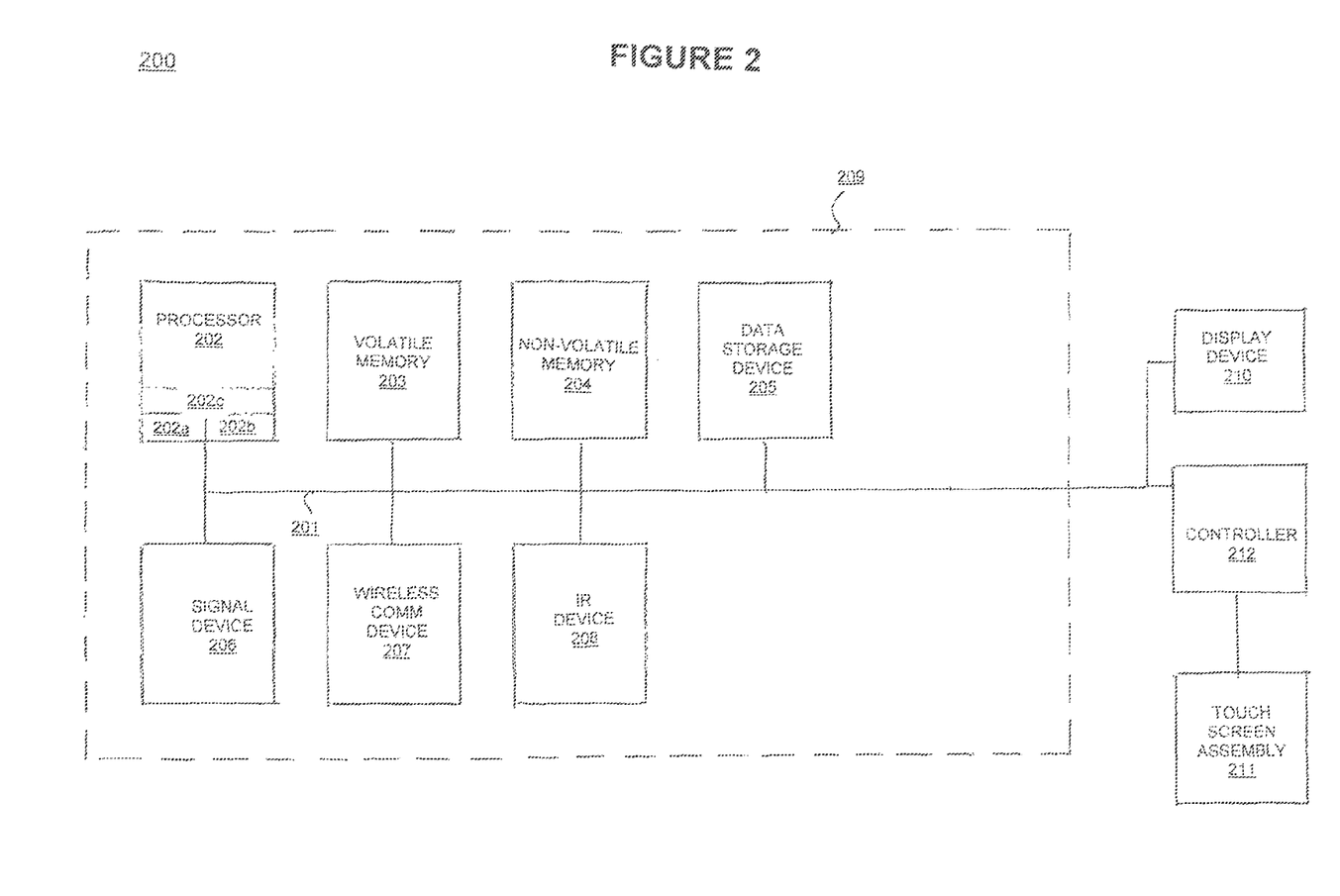
FIG. 2 is a block diagram of an exemplary handheld computer system upon which embodiments of the present invention may be implemented.

FIG. 2 is a block diagram of a handheld computer system 200 upon which embodiments of the present invention may be implemented. It is noted that some components of handheld computer system 200 have been omitted for clarity. In embodiments of the present invention, handheld computer system may be a personal digital assistant (PDA), cellular telephone, data collector (e.g., a geographic information system (GIS) data collector), etc. However, while FIG. 2 shows a handheld computer system, it is noted that embodiments of the present invention are not limited to handheld. devices alone. Instead, embodiments of the present invention may be implemented with other devices which utilize a touch screen assembly as well. Handheld computer system 200 includes an address/data bus 201 for communicating information, a central processor 202 coupled with the bus 201 for processing information and instructions, a volatile memory 203 (e.g., random access memory RAM) coupled with the bus 201 for storing information and instructions for the central processor 202 and a non-volatile memory 204 (e.g., read only memory ROM) coupled with the bus 201 for storing static information and instructions for the processor 202. It is noted that central processor 202 further comprises a comparator 202a, a programmable threshold voltage 202b, and an executable sub-routine 202c. It is further noted that While comparator 202a, programmable threshold voltage 202b, and executable sub-routine 202c are shown as resident in central processor 202, they may reside in other components of handheld computer system 200 in other embodiments of the present invention. Handheld computer system 200 also includes an optional data storage device 205 (e.g., thin profile removable memory) coupled with the bus 201 for storing information and instructions and which can be removable.

As described above, handheld computer system 200 also contains a signal communication device 206, also coupled to bus 201. Signal communication device 206 can be a serial port (or USB port) for communicating with a cradle (not shown). In addition to device 206, wireless communication links can be established between the handheld computer system 200 and a host computer system (or another handheld computer system) using a wireless device 207 (e.g., a cellular communication device, or a Bluetooth® device) or an infrared device 208. These components are housed on a circuit board 209 which is contained within a cover assembly.

Also included in handheld computer system 200 of FIG. 2 is a display device 210. Display device 210 may be an electronic ink, electronic paper, digital paper or other reflective display devices suitable for creating graphic images and alphanumeric characters recognizable to the user.

Handheld computer system 200 also includes a touch screen assembly 211 coupled with bus 201 via a controller 212. In the present invention, touch screen assembly 211 may comprise, but is not limited to, a flat panel resistive touch screen assembly as described above with reference to FIG. 1. Touch screen assembly 211 can communicate information (spatial data) and command selections to the central processor 202. Touch screen assembly 211 is further capable of registering a position on the display device 210 where contact is made between resistive digitizer film 120 and digitizing element 130.

As will be described in greater detail below, in embodiments of the present invention, controller 212 measures a voltage which is output by an analog multiplexor/demultiplexor when contact between resistive digitizing film 120 and digitizing element 130 occurs, Embodiments of the present invention then determine whether the amount of pressure applied on touch screen assembly 211 indicates whether an intended touch (e.g., user input) is occurring, or if a false touch is occurring due to temperature fluctuation or loss of tension in the touch screen assembly components. For example, comparator 202a compares the voltage output from the analog multiplexor/demultiplexor with programmable threshold voltage 202b. If the output voltage is at least equal to programmable threshold voltage 202b, comparator 202a initiates a signal which indicates that the pressure applied to touch screen assembly 211 comprises a valid input event. If comparator 202a determines that the output voltage is less than programmable threshold voltage 202b, comparator 202a will not initiate a signal indicating a valid input event, or will initiate a signal indicating an invalid input event.

The use of a programmable threshold voltage (e.g., 202b) is advantageous over conventional touch screen assemblies which utilize a fixed built-in cutoff voltage to indicate when con act is made between the elements of the touch screen assembly. Because they do not utilize a programmable threshold voltage to differentiate between intentional contact between the resistive layers (e.g., 120 and 130), conventional touch screen assemblies are subject to misinterpreting signals generated when the touch screen assembly is exposed to the temperature fluctuations and/or repeated use described above with reference to FIG. 1. As a result, the usable lifespan of conventional touch screen assemblies is limited by their inability to differentiate between valid and unintended inputs. However, embodiments of the present invention can more precisely define what constitutes a valid input event due to the use of programmable threshold voltage 202b. Additionally, the value of programmable threshold voltage 202b can be changed as needed to account for changes in the tension of, for example, outer protective layer 110 and/or resistive digitizer film 120 due to repeated use.

Thus, embodiments of the present invention extend the usable lifespan of a touch screen assembly and the devices which use them. For example, a user of a PDA is likely to just buy a new PDA if its touch screen assembly begins exhibiting erratic performance after repeated use. This is typically regarded as easier and more cost effective than replacing or repairing the existing touch screen assembly. However, for organizations which may issue large numbers of handheld computer systems (e.g., a surveying operation which may use dozens or hundreds or data collectors), this option is prohibitively expensive. Using embodiments of the present invention, the usable lifespan of the touch screen assembly can be extended.

Figure 3:
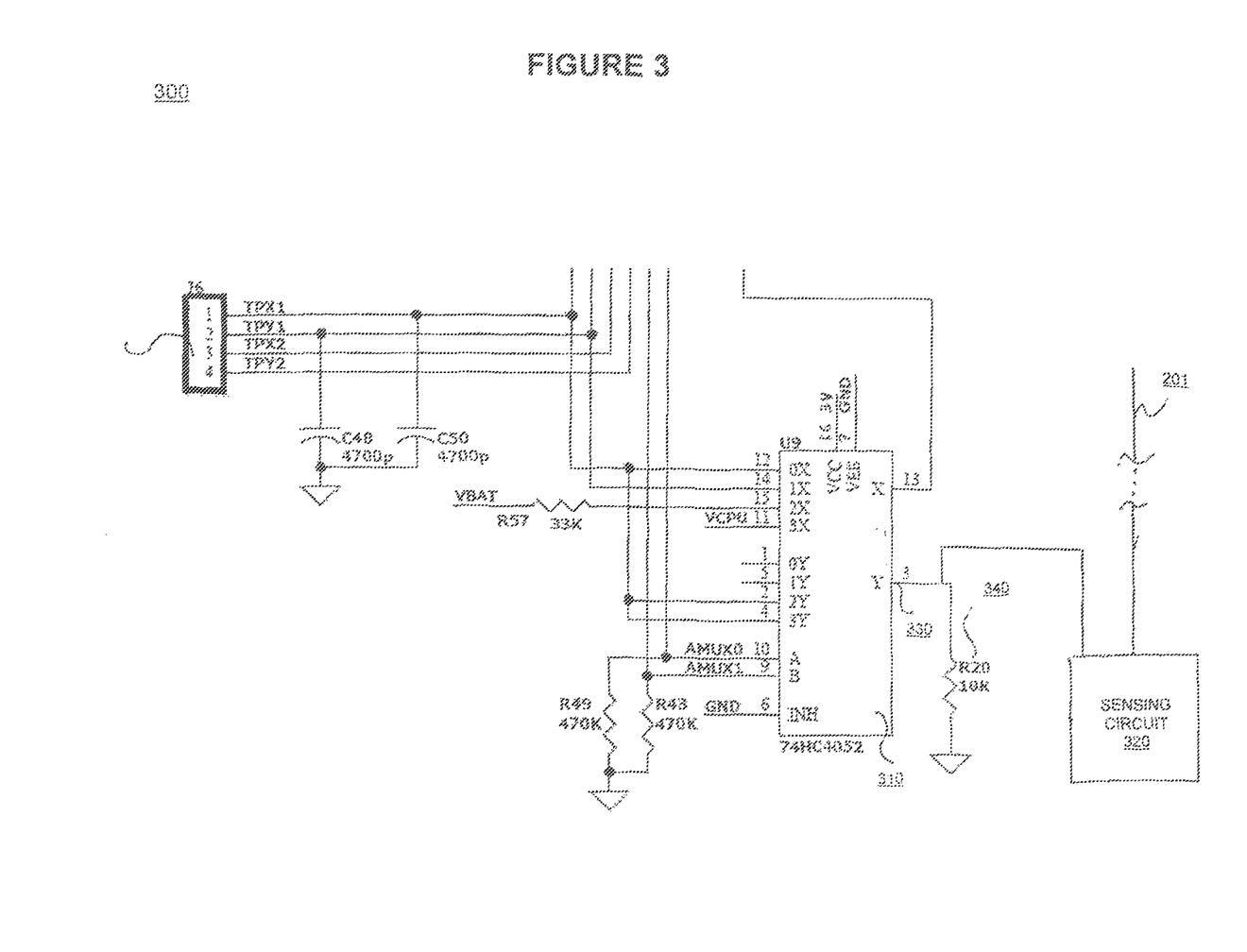
FIG. 3 is a diagram of a portion of a sensor circuit used in accordance with embodiments of the present invention.

FIG. 3 is a diagram of a portion of a sensor circuit 300 used in accordance with embodiments of the present invention. In FIG. 3, signals from a resistive touch screen assembly (e.g., touch screen assembly 211 of FIG. 2) are received at an integrated circuit 310 which is utilized as an analog multiplexor/demultiplexor. In embodiments of the present invention, the signals received from touch screen assembly 211 are analog signals which are generated when resistive digitizer film 120 contacts digitizing element 130. It is noted that while the embodiment of FIG. 3 shows a 4-wire touch screen assembly, embodiments of the present invention are well suited to be utilized with 5-wire touch panel assemblies as well.

Also shown in FIG. 3 is a sensing circuit 320 which measures the voltage across resistor R20 (e.g., 340 of FIG. 3). In embodiments of the present invention, the voltage output at pin 330 of integrated circuit 310 varies depending upon the amount of force exerted upon touch screen assembly 211. For example, when unintended contact between resistive digitizer film 120 and digitizing element 130 occurs, less force is typically exerted than if a user is intentionally using touch screen assembly 211 to input data. Thus, false touches (e.g., due to temperature fluctuations, or loss of tension of resistive digitizer film 120 and/or outer protective layer 110) typically exhibit a higher resistance than intended touches due to the greater pressure applied to touch screen assembly 211 when a user is inputting data. In other words, when a false touch of touch screen assembly 211 occurs, the voltage at resistor 340 will typically be lower than when an intended touch occurs.

In embodiments of the present invention, the voltage measured at resistor 340 by sensing circuit 320 is accessed by comparator 202a and compared with programmable threshold voltage 202b). If the voltage measured by sensing circuit 320 is at least equal to programmable threshold voltage 202b, comparator 202a initiates a signal indicating that a valid touch event has occurred. If the voltage measured by sensing circuit 320 is less than programmable threshold voltage 202b, comparator 202a will not initiate a signal indicating that a valid touch event has occurred, or will initiate a signal indicating that an invalid touch event has occurred.

Figure 4:
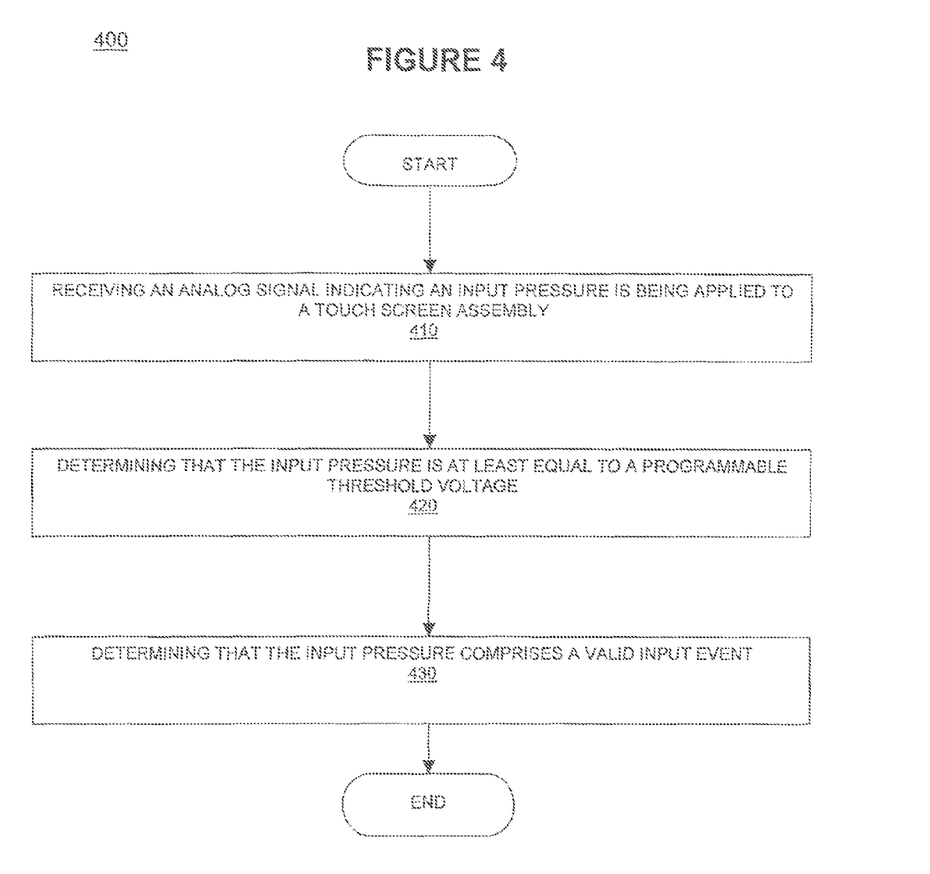
FIG. 4 is a flow chart of a method for extending the lifespan of a touch screen assembly in accordance with embodiments of the present invention.

FIG. 4 is a flow chart of a method 400 for extending the lifespan of a touch screen assembly in accordance with embodiments of the present invention. In step 410 of FIG. 4, an analog signal is received indicating an input pressure is being applied to a touch screen assembly. For the purposes of the present invention, the input pressure may be the result of an intended, or unintended contact between, for example, resistive digitizer film 120 and digitizing element 130 and which has not yet been identified as being a valid or invalid input event. As described above, an analog signal is generated by touch screen assembly 211 when a resistive digitizer film (e.g., 120) contacts a digitizing element (e.g., 130).

In step 420 of FIG. 4, a determination is made that the input pressure is at least equal to a programmable threshold voltage. As discussed above with reference to FIG. 3, when an input pressure is made on touch screen assembly 211, a voltage is output from pin 330 which is measured by sensing circuit 320. This voltage is accessed by comparator 202a and compared with programmable threshold voltage 202b. In embodiments of the present invention, if the voltage measured by sensing circuit 320 is at least equal to programmable threshold voltage 202b, comparator 202a initiates a signal indicating that a valid touch event has occurred. If the voltage measured by sensing circuit 320 is less than programmable threshold voltage 202b, comparator 202a will not initiate a signal indicating that a valid touch event has occurred, or will initiate a signal indicating that an invalid touch event has occurred.

In step 430 of FIG. 4, a determination is made that the input pressure comprises a valid input event. As described above, if the voltage measured by sensing circuit 320 is at least equal to programmable threshold voltage 202b, comparator 202a initiates a signal indicating that a valid touch event has occurred.

Figure 5:
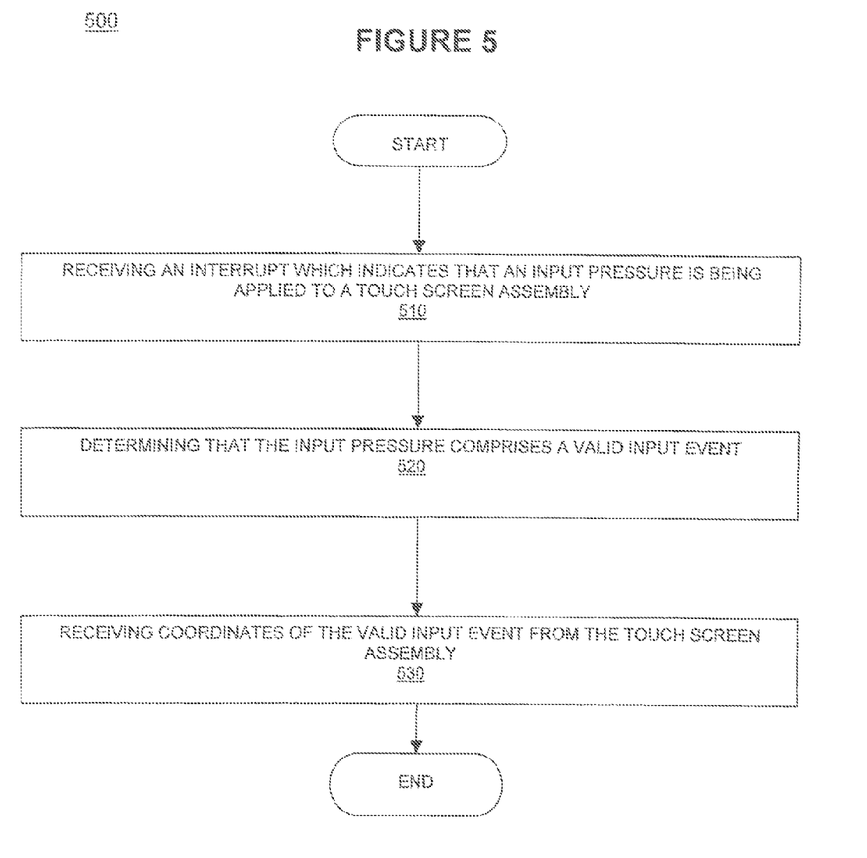
FIG. 5 is a flow chart of a method for extending the lifespan of a touch screen assembly in accordance with embodiments of the present invention.

FIG. 5 is a flow chart of a method 500 for extending the lifespan of a touch screen assembly in accordance with embodiments of the present invention. In step 510 of FIG. 5, an interrupt is received which indicates that an input pressure is being applied to a touch screen assembly. In embodiments of the present invention, a hardware interrupt is received by processor 202. In embodiments of the present invention, processor 202 may first determine which device generated the hardware interrupt. If the interrupt was generated by touch screen assembly 211, processor 202 may execute sub-routine 202c to determine whether a valid or invalid input event has occurred. In one embodiment, the sub-routine may be resident in processor 202 (e.g., executable subroutine 202c of FIG. 2). However, in other embodiments of the present invention, the sub-routine may be resident in the controller 212, the hardware controller, or in another device.

In step 520 of FIG. 5, a determination made that the input pressure comprises a valid input event. As described above with reference to FIGS. 3 and 4, a voltage which is output from analog multiplexor/demultiplexor 310 in response to the input pressure Which is measured by sensing circuit 320 and accessed by comparator 202a. If it is determined that the voltage measured by sensing circuit 320 is at least equal to the programmable threshold voltage 202b, it is determined that the input pressure comprises a valid input event.

In step 530 of FIG. 5, the coordinates of the valid input event are received from the touch screen assembly. In response to determining that the input pressure comprises a valid input event, the coordinates of the valid input event are then received from touch screen assembly 211 to determine what the user is inputting. If it is determined that the input pressure does not comprise a valid input event, the input pressure is ignored and no further action is taken.

Embodiments of the present invention, a method and system for extending the lifespan of a touch screen assembly, are thus described. While the present invention has been described in particular embodiments, it should be appreciated that the present invention should not be construed as limited by such embodiments, but rather construed according to the below claims.

What is claimed is:

1. A system for extending the lifespan of a touch screen, the system comprising:
a four wire touch screen assembly comprising a plurality of layers, the touch screen assembly having four output voltages that are related to a pressure exerted upon the touch screen assembly, wherein two of the four output voltages are related to the pressure exerted upon the touch screen assembly with respect to an x-dimension and the other two of the four output voltages are related to the pressure exerted upon the touch screen assembly with respect to a y- dimension, wherein the plurality of layers include:
an outer protective layer;
a resistive digitizer film, wherein the outer protective layer substantially covers and protects the resistive digitizer film; and
a digitizing element, wherein the resistive digitizer film is located between the outer protective layer and the digitizing element;
an analog multiplexer/demultiplexer having four input voltages and an output voltage, wherein the four input voltages of the analog multiplexer/demultiplexer are related to the four output voltages of the touch screen assembly;
a resistor configured to receive the output voltage of the analog multiplexer/demultiplexer such that a voltage across the resistor is equal to the output voltage of the analog multiplexer/demultiplexer;
a first capacitor coupled to a first wire carrying a first output voltage of the four output voltages, the first output voltage related to the pressure exerted upon the touch screen assembly with respect to the x-dimension, the first capacitor further coupled to a ground;
a second capacitor coupled to a second wire carrying a second output voltage of the four output voltages, the second output voltage related to the pressure exerted upon the touch screen assembly with respect to the y-dimension, the second capacitor further coupled to the ground;
a sensing circuit configured to measure the voltage across the resistor;
a comparator configured to perform operations including:
accessing the measured voltage across the resistor;
comparing the measured voltage across the resistor with a programmable threshold voltage; and
initiating a signal indicating that a valid touch has occurred when the measured voltage across the resistor is at least equal to the programmable threshold voltage; and
a controller configured to:
receive a hardware interrupt indicating that the pressure is being exerted upon the touch screen assembly; and
increase the programmable threshold voltage to account for a loss of tension of the resistive digitizer film.

2. The system of claim 1 wherein at least one of the one or more output voltages of the touch screen assembly is an analog signal.

3. The system of claim 1 wherein the controller is further configured to adjust the programmable threshold voltage to account for temperature fluctuations.

4. The system of claim 1 wherein the controller is further configured to determine the coordinates of the pressure exerted upon the touch screen assembly.

5. The system of claim 1 wherein the touch screen assembly, the analog multiplexer/demultiplexer, the resistor, the sensing circuit, the comparator, and the controller are disposed in a handheld electronic device.

6. A sensor circuit for extending the lifespan of a touch screen, the sensor circuit comprising:
an analog multiplexer/demultiplexer having four input voltages and an output voltage, wherein the four input voltages of the analog multiplexer/demultiplexer are related to four output voltages of a four wire touch screen assembly, wherein two of the four output voltages are related to the pressure exerted upon the touch screen assembly with respect to an x- dimension and the other two of the four output voltages are related to the pressure exerted upon the touch screen assembly with respect to a y-dimension, wherein the touch screen assembly comprises a plurality of layers including:
an outer protective layer;
a resistive digitizer film, wherein the outer protective layer substantially covers and protects the resistive digitizer film; and
a digitizing element, wherein the resistive digitizer film is located between the outer protective layer and the digitizing element;
a resistor configured to receive the output voltage of the analog multiplexer/demultiplexer such that a voltage across the resistor is equal to the output voltage of the analog multiplexer/demultiplexer;
a first capacitor coupled to a first wire carrying a first output voltage of the four output voltages, the first output voltage related to the pressure exerted upon the touch screen assembly with respect to the x-dimension, the first capacitor further coupled to a ground;
a second capacitor coupled to a second wire carrying a second output voltage of the four output voltages, the second output voltage related to the pressure exerted upon the touch screen assembly with respect to the y-dimension, the second capacitor further coupled to the ground;
a sensing circuit configured to measure the voltage across the resistor;
a comparator configured to perform operations including:
accessing the measured voltage across the resistor;
comparing the measured voltage across the resistor with a programmable threshold voltage; and
initiating a signal indicating that a valid touch has occurred when the measured voltage across the resistor is at least equal to the programmable threshold voltage; and
a controller configured to:
receive a hardware interrupt indicating that the pressure is being exerted upon the touch screen assembly; and
increase the programmable threshold voltage to account for a loss of tension of the resistive digitizer film.

7. The sensor circuit of claim 6 wherein at least one of the one or more output voltages of the touch screen assembly is an analog signal.

8. The sensor circuit of claim 6 wherein the controller is further configured to adjust the programmable threshold voltage to account for temperature fluctuations.

9. The sensor circuit of claim 6 wherein the controller is further configured to determine the coordinates of the pressure exerted upon the touch screen assembly.

10. The sensor circuit of claim 6 wherein the touch screen assembly, the analog multiplexer/demultiplexer, the resistor, the sensing circuit, the comparator, and the controller are disposed in a handheld electronic device.

\* \* \* \* \*